Aug. 6, 1940.  A. W. TRONNIER  2,210,191
TELEMETER
Filed Aug. 9, 1938
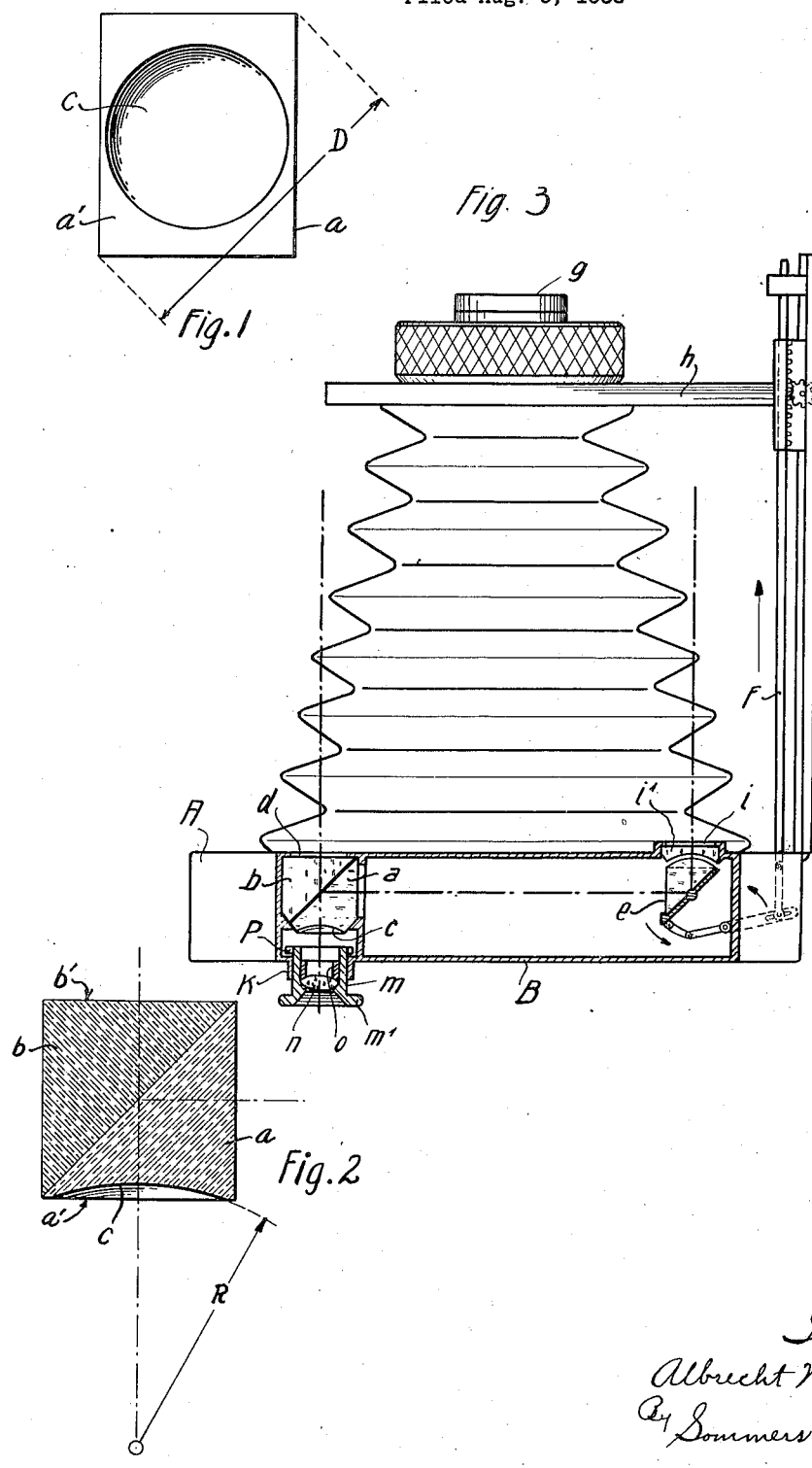
Inventor
Albrecht W. Tronnier
By Sommers & Young
Attys.

Patented Aug. 6, 1940

2,210,191

UNITED STATES PATENT OFFICE 2,210,191

TELEMETER

Albrecht Wilhelm Tronnier, Gottingen, Germany, assignor to Jos. Schneider & Co. Optotechnische Gesellschaft Berlin, Berlin, Germany, a firm of Germany Application August 9, 1938, Serial No. 223,961
In Germany January 18, 1936

3 Claims. (Cl. 88—2.4)

This invention relates to telemeters and has more particular reference to a combined ray dividing and finder system consisting of two prismatic bodies connected together by a cemented surface which is wholly or in part reflecting, and a dispersing lens serving as finder lens. Such systems are intended more particularly for incorporation in base telemeters for photographic cameras, in which the system constitutes at the same time one end mirror of the telemeter whereas the second end mirror, a rotatable prism or the like, is arranged at the opposite side of the telemeter housing.

Hitherto the dispersing lens, which is also called the Newton finder lens, was added separately from the ray dividing system, usually in such a way that due to the different combinations convex surfaces were facing towards the observing eye. Constructions are also known in which the said finder lens is cemented to the ray dividing system to form an optical unit therewith.

One object of the present invention is to provide a great simplification as well as a far-reaching reduction in the external dimensions of such a system with a high degree of freedom from distortion. A further object of the invention is to provide a system of this kind with a field of vision which is increased considerably in comparison with existing systems. In the new system the field of vision can exceed 40° and amount to about 55° and more, corresponding to the large aperture of modern objectives as used for example for photographic purposes.

One embodiment of the invention is represented diagrammatically in the accompanying drawing, in which Fig. 1 shows a front view, Fig. 2 a horizontal section and Fig. 3 shows by way of example the incorporation of the new system in a telemeter for photographic cameras.

The new system consists in known manner of two prismatic bodies $a$, $b$ connected together by a cemented surface which is wholly or in part reflecting. The surface $a'$ of one prism $a$ which forms the observation surface facing towards the eye incorporates a concave lens surface $c$, which in accordance with the invention is ground directly in the said surface so that the center of curvature of the concave surface lies towards the observing eye. The radius of curvature R of the concave lens surface $c$ is moreover of such a length that it is smaller than the diagonal D of the outer face $b'$ of the system which is turned towards the object which is to be observed.

Such a system according to the invention has a small size and affords a large field of observation and thus is particularly suitable for a ray dividing and finder system in optical telemeters for photographic cameras of compact construction and such a sphere of utilisation is shown in Fig. 3. In this figure the new system is indicated by $a$, $b$, $c$ and is fixed in one end of a telemeter housing B attached to the camera housing A, the telemeter housing having an opening at either end on the side facing towards the object to be photographed. The observation opening in front of the concave lens surface $c$ of the system $a$, $b$, $c$ is formed by a short tube $k$ mounted on the housing B and carries a slidable tube $m$, which accommodates a double convex collecting lens $n$ which is held in position by a clamping ring $o$ or the like. A stop $p$ on the tube $m$ prevents the complete withdrawal of the tube, whereas it is prevented from being thrust too far into the tube $k$ when not in use by means of the flange $m'$ on the tube $m$. The opening $d$ opposite this observation opening serves at the same time as a finder diaphragm.

Provided at the other end of the telemeter housing B in known manner is a rotatable prism $e$ (or a mirror) which is operatively coupled with the support $h$ for the objective $g$ of the camera by means of suitable adjusting members and a rod $f$. The second opening $i$ in the housing B on the side facing towards the object to be photographed is enclosed by means of a plano-concave lens $i'$ disposed in front of the prism $e$.

In viewing the object to be photographed through the eye-piece $k$, $m$, $n$, the system $a$, $b$, $c$ makes it possible on the one hand to obtain a direct view whereby the opening $d$ at the same time indicates the field covered by the photograph and on the other hand, as indicated in chain dotted lines, the path of the rays within the system is divided which can be effected by only partly silvering the cemented surface connecting the two prisms $a$, $b$. In this way a second image of the object to be photographed is presented to the eye of the observer in known manner by way of the rotary prism $e$ and by bringing the two images into coincidence the objective $g$ is focussed precisely on the object which is to be photographed.

I claim:

1. In a telemeter, a combined ray-dividing and finding system comprising two prismatic bodies connected together at a cemented surface which is in part reflecting, one of said prisms having a concave lens surface formed directly in its surface on the side toward the eye of the observer, the center of curvature of said concave lens surface being towards the eye and the radius of curvature thereof being smaller than the length of the diagonal of the surface of the system which is turned towards the object to be observed.

2. In a telemeter, a combined ray-dividing and finding system as claimed in claim 1, a housing accommodating said system, an eye-piece slidable towards and away from the concave lens surface of said system, and the housing at the surface of the system which is turned towards the object having an aperture formed therein serving as diaphragm limiting the field of vision.

3. In a telemeter, a combined ray-dividing and finding system as claimed in claim 1, a housing accommodating said system, an eye-piece slidable towards and away from the concave lens surface of said system, and means limiting the movement of said eye-piece towards and away from said concave lens surface.

ALBRECHT WILHELM TRONNIER.